United States Patent
Smith et al.

[11] Patent Number: 6,167,127
[45] Date of Patent: Dec. 26, 2000

[54] TELEPHONE SYSTEM USING RECORDED MESSAGES TO MAKE OUTBOUND ANNOUNCEMENTS

[75] Inventors: Don Smith, Nepean; Tom Gray, Carp, both of Canada

[73] Assignee: Mitel Corporation, Kanata, Canada

[21] Appl. No.: 08/893,227

[22] Filed: Jul. 15, 1997

[30] Foreign Application Priority Data

Jul. 15, 1996 [CA] Canada ................................. 2181199

[51] Int. Cl.[7] ................................................ H04M 3/48
[52] U.S. Cl. ....................... 379/209; 379/67.1; 379/88.24
[58] Field of Search ............................. 379/67.1, 70, 77, 379/79, 88.22, 88.23, 88.24, 373, 374, 375, 208, 209

[56] References Cited

U.S. PATENT DOCUMENTS

| | | | |
|---|---|---|---|
| 4,908,845 | 3/1990 | Little ........................................... | 379/51 |
| 4,939,771 | 7/1990 | Brown et al. .......................... | 379/88.26 |
| 5,189,692 | 2/1993 | Ferrara .................................. | 379/88.28 |
| 5,422,937 | 6/1995 | Ferrara .................................. | 379/67.1 |
| 5,539,808 | 7/1996 | Inniss et al. ........................... | 379/88.22 |
| 5,559,867 | 9/1996 | Langsenkamp et al. .................. | 379/69 |
| 5,604,792 | 2/1997 | Solomon et al. ...................... | 379/88.23 |
| 5,642,407 | 6/1997 | He .............................................. | 379/87 |
| 5,644,624 | 7/1997 | Caldwell .................................... | 379/69 |
| 5,734,701 | 3/1998 | Kuwabara et al. .................... | 379/88.23 |
| 5,742,666 | 4/1998 | Alpert ........................................ | 455/404 |
| 5,751,794 | 5/1998 | Kugell et al. ......................... | 379/88.22 |
| 5,799,066 | 8/1998 | Joyce et al. ............................ | 379/88.04 |
| 5,844,967 | 12/1998 | Lee ........................................ | 379/265 |

FOREIGN PATENT DOCUMENTS 2 311 189   3/1997   United Kingdom .

*Primary Examiner*—Krista Zele
*Assistant Examiner*—Roland G. Foster
*Attorney, Agent, or Firm*—Marks & Clerk

[57] ABSTRACT

An automated telephone system includes a telephone terminal for communicating with a remote party over a telephone line; a storage device for storing a plurality of pre-recorded voice messages entered through said terminal; and a service controller connected to the telephone terminal and the storage device. The service controller is responsive to commands entered through the telephone terminal either to store spoken messages in said storage device and associate them with a unique identifier, or to access a selected one of the stored messages using its unique identifier and replay it over the telephone line to a remote party.

7 Claims, 2 Drawing Sheets

TELEPHONE SYSTEM USING RECORDED MESSAGES TO MAKE OUTBOUND ANNOUNCEMENTS

BACKGROUND OF THE INVENTION

This invention relates to an automated telephone system.

In commercial, and many home environments, most users now make use of some kind of automatic answering facility to store messages in the event that a called party is either busy or unavailable.

The problem is a large amount of time is wasted leaving the same kind of message on answering machines. Classic examples of this include:

1. The 'phone-tag' scenario where two colleagues constantly miss each other and leave 'Hi, it's John, call me when you're back' type messages.
2. An office receptionist calling to confirm appointments and spending a significant amount of time leaving messages on machines.

Typically when a called party is not available, the caller gets an answering machine. After you hearing exhortation to 'Please leave a message', the caller leaves a message of his or her own. Usually this message sounds like: 'Hi, this is John Doe, it's 10:30 am on Monday, give me a call at x5551 when you get in.' or 'Hi, this is Dr. Doe's office reminding you of your appointment tomorrow afternoon. Please give us a call at 555-1122 if you have any questions.'

Existing callback functionality on PBX and CO's (Central Offices) has specific deficiencies. On such a system a user can request a callback from a busy or extension or an extension from which no answer is given. In such a case, the user is alerted when the previously busy line is free and is allowed to make a call, or in the case of the no answer the user is alerted when the system notices that there is activity on that line.

These services are often inadequate, for example, when the user moves away from his telephone or is constantly using his telephone because the callback alert will not reach him. Also, it frequently occurs that the called user will drop his call and then leave his desk immediately. In this case, the user may be alerted to the fact that the line is free, but the callback will fall. The call back features will only work if the called and calling parties happen to be at their stations simultaneously when it matters. This forces the calling party to wait at his station until the called party performs some action. In the case in which the called line is constantly in use, the calling party's call can be suspended for a considerable period. In the common case in which the called party moves away from his desk after a call, the calling party will be annoyed by a call-back alert that will result in a failed call.

Within some enterprise phone groups, it is possible to press a 'message' button when you have a busy or no answer signal is received. The receiver's phone will flash and that person can set a callback with the press of a button. This is exemplified with the 'message' button on the Mitel Superset™ 410.

An object of the invention is to alleviate the aforementioned problems of the prior art.

SUMMARY OF THE INVENTION

According to the present invention there is provided an automated telephone system comprising a telephone terminal for communicating with a remote party over a telephone line; a storage device for storing a plurality of pre-recorded voice messages entered through said terminal; and a service controller connected to said telephone terminal and said storage device, said service controller being responsive to commands entered through said telephone terminal either to store spoken messages in said storage device and associate them with a unique identifier, or to access a selected one of said stored messages using its unique identifier and replay it over the telephone line to a remote party.

The invention allows a caller to leave a pre-canned message without the need to repeat it in real-time into the answering machine of the called party.

In one embodiment, the service controller can append the date and/or time to the pre-canned message.

The system is triggerable by user. It allows human—human interaction when a human answers the phone and machine—machine interaction when a machine answers the phone. Furthermore, it is usable for all lines, not just those on same system. It can save a substantial amount of time on routine calls.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

Figure 1:
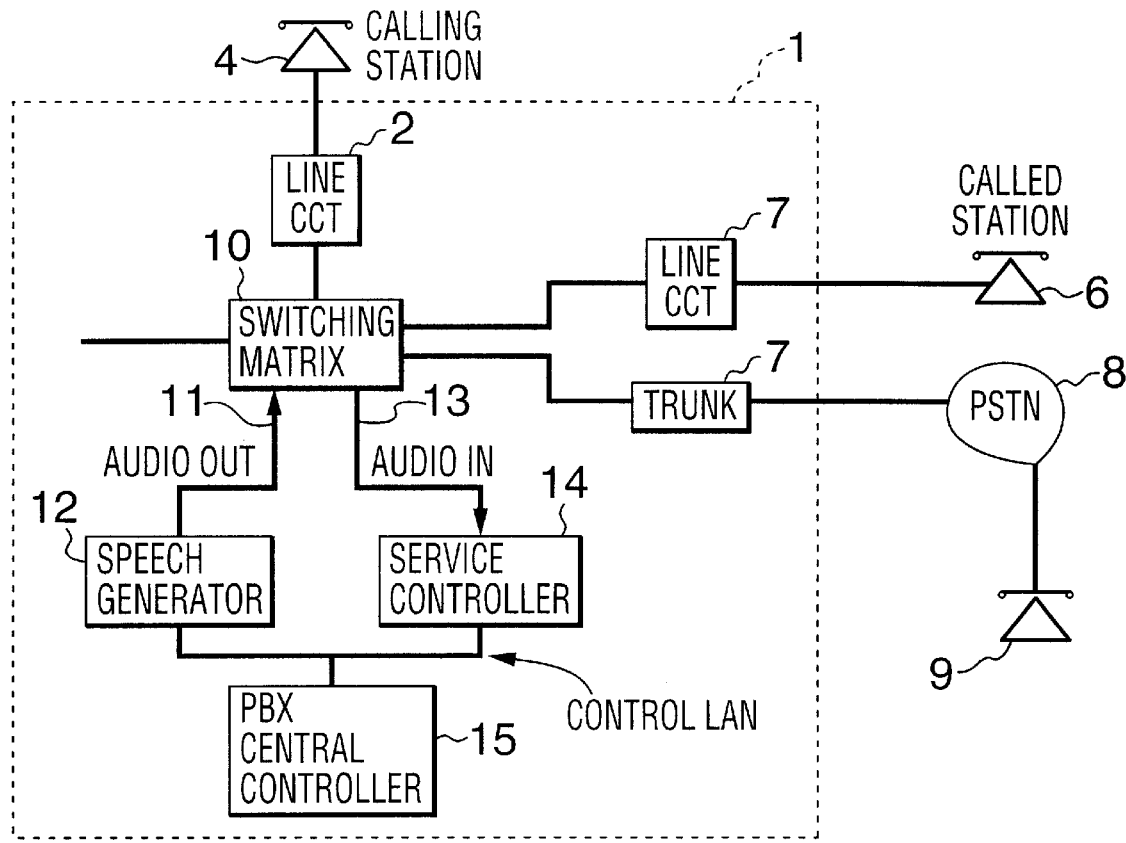
FIG. 1 is a block diagram of a digital PABX implementing the present invention.

In FIG. 1, the digital PABX 1 comprises a line circuit 2 connected via a telephone line 3 to a calling station 4. Line circuit 2 is connected to switching matrix 10, which in turn is shown connected via line circuit 5 to called station 6 and via trunk 7 through the PSTN (Public Switched Telephone Network) 8 to, for example, remote telephone 9. In practice, of course, there may be a large number of line circuits and trunks, the function of the switching matrix 10 being to establish a connection between any two telephone stations. This portion of the PABX is conventional and similar, for example, to a PABX sold by Mitel Corporation.

The switching matrix has audio ports 11, 11a connected to a speech generator 12 and an audio port 13 connected to a service controller 14. The speech generator 12 and service controller 14 are connected to the PBX central controller 15 via a control LAN.

Figure 2:
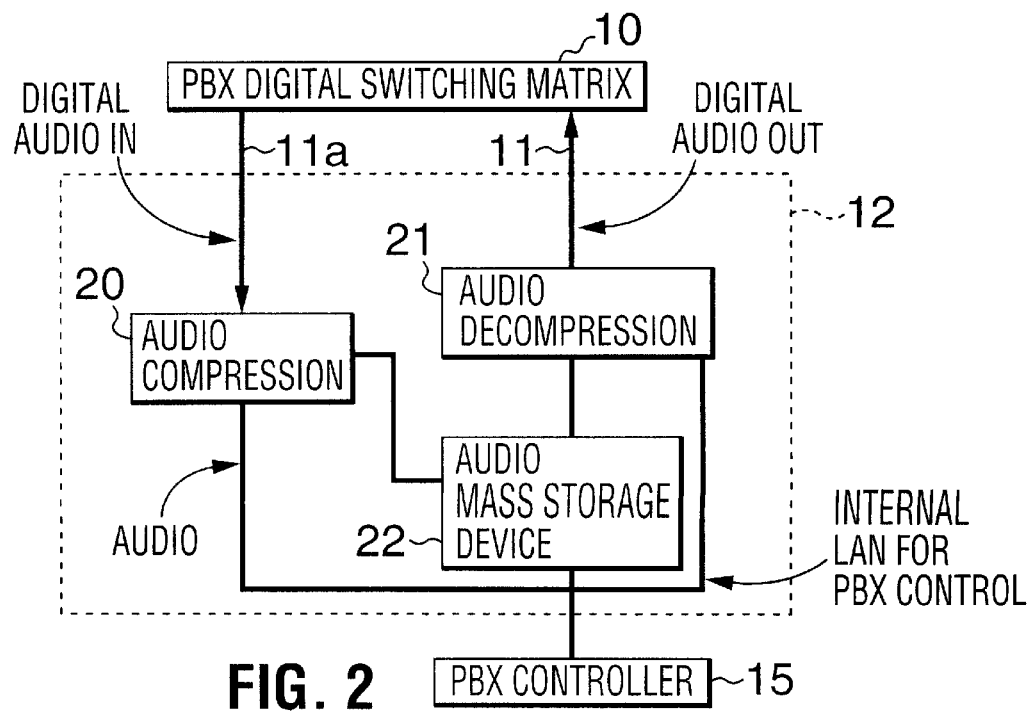
FIG. 2 shows the speech generator in more detail.

As shown in FIG. 2, the speech generator 12 comprises an audio compression unit 20, an audio decompression unit 21, and an audio mass storage device 22. The audio compression unit 20, audio decompression unit 21, and audio mass storage device 22 are connected together via an internal control LAN.

Figure 3:
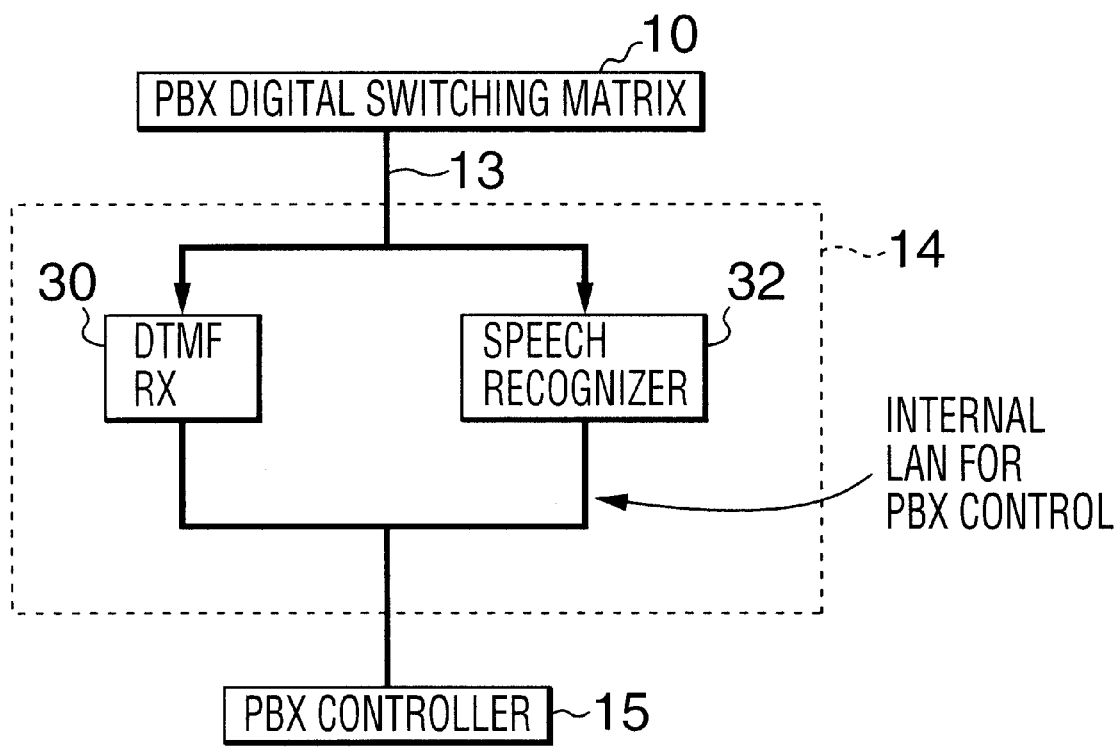
FIG. 3 shows the service controller in more detail.

The service controller 14, shown in FIG. 3, comprises a DTMF decoder 30 and a speech recognizer 32.

The invention will be described for this implementation. Other configurations in which the speech generator and service controller are implemented on special purpose hardware and connected to the PBX in hardware by trunks for audio and LAN for control with software interoperation through known computer telephony protocols are also possible.

The operation will be initially be described for the case in which the called and calling parties are on the same PBX.

The situation will first be considered where the calling party has attempted to make a call to the called party. The called station is either busy or does not answer.

The calling party can indicate that he wishes access to the service by flashing the switchook and dialling an access code. Alternatively, with a special purpose telephone, either a soft or hard key can be provided to offer access to the circuit.

The calling party is connected through the PBX switching matrix to the speech generator 12 and service controller 14. These act together with the PBX central controller 15 to generate a dialogue by which the calling party can indicate his service requirements.

Speech signals, which offer service options, are stored in compressed format on the audio mass storage device 22. This is designed employing known technology to store speech samples in such a way that the PBX controller 15 can construct dialogues which can offer alternatives for service to the calling party. These are stored in compressed format and decompressed in the audio decompressor 21.

The PBX controller 15 instructs the audio mass storage device 22 to enter the service dialogue with the calling party.

The calling party can then participate in this dialogue either by sending DTMF tones or speaking. These signals are received by the service controller, which is equipped with a DTMF decoder 30 and a speech recognizer 32, although of course only one of these need be employed. These signals are decoded and interpreted as service control signals by the PBX controller 15.

The audio mass storage device 22 also has the ability to store canned messages; assemble date and time, and time of day speech messages from information supplied by the PBX controller, and record in compressed format and later play back impromptu messages. Within the control dialogue, the user can either select a pre-programmed canned message or record an impromptu message to be sent to the called party.

In the case of an impromptu message, the calling party audio is connected to the audio compressor 20 and then stored in a file on the audio mass storage device 22.

The calling party can now hang up and leave the completion of his message to the PBX.

The PBX controller 15 can now follow several strategies to complete the call:

a) If the line is busy, it can place a camp-on on the line which will detect when the line becomes free;

b) if the line is not busy, it can set a call-back on the line, which will detect the next time the line is used.

c) As an addition to a) and b), the PBX can periodically attempt to call the line.

With a), b), c), the PBX will persist in attempting to deliver the message until someone answers or until a pre-set time-out occurs.

FIG. 1 is a block diagram of an automated telephone system in accordance with the invention.

The operation of the system will be described in more detail as follows:

Setup Phase:

1. The user lifts the receiver and enters a special setup code for setup. This can be accomplished by means of a DTMF or rotary digits. In the case of digital phones or computers, a signal may be sent to the service controller 10.

2. In response to the setup code, a speech generated voice guides the user, who communicates by means of DTMF, rotary digits or sending a signal to the service controller. Via the menu, the user stores canned messages for future retrieval. These messages are stored in digital form the in the storage unit 12 with identifiers for subsequent retrieval.

Use Phase

1. The user lifts the receiver on a telephone 2 and dials a colleague on a telephone 7.

a) If the colleague answers, conversation takes place normally.

b) If the user is prompted to leave a message by a remote answering service, he or she can simply leave a voice message or proceed through the following steps:

i) The user presses a 'soft-key' which signals the service controller 10 they want it to leave a message.

ii) The user enters an identifier by means of a DTMF, rotary digit or signal from a digital phone or computer. The service controller 10 takes over the line and the user can hang up their receiver.

iii) Based on the identifier the service controller retrieves the message from the storage device (which was entered in the setup phase).

iv) The service controller plays the message using the speech generator.

v) The service controller terminates the connection.

c) If the user hears a busy signal he or she can hang-up and try later or:

i) Signal with a flash hook (or digital signal if using a digital phone or computer).

ii) The user is prompted with a distinctive dial tone.

iii) The user signals by means of DTMF, rotary dial or a digital signal that they want the busy line monitored until the line is free.

a) If user wants a canned message to be played when the line is free they enter the identifier.

b) If the user wants to send an impromptu message they simply state the message. It gets stored temporarily.

iv) The user hangs up and goes on with their business.

v) The service controller 10 monitors the busy line until it is free.

vi) When free, the service controller 10 retrieves the appropriate message and plays it using the speech generator 11. If it was an impromptu message which was played the service controller removes it from memory.

vii) The service generator terminates the connection.

d) If the user decides that there is no answer he or she can hang-up and try later or:

i) Signal with a flash hook (or digital signal if using a digital phone or computer).

ii) The user is prompted with a distinctive dial tone.

iii) The user can signal by means of DTMF, rotary dial or digital signal that they want the busy line monitored until the line is free.

a) If user wants a canned message to be played when the line is free he or she enters the identifier. If the user wants to send an impromptu message, he simply states the message. It gets stored temporarily.

iv) The user hangs up and goes on with his business.

v) The service controller re-dials the number at specified intervals until there is an answer. When answered, the service controller retrieves the appropriate message and plays it using a speech generator. If it was an impromptu message which was played the service controller removes it from memory.

If desired a real-time buffer can be connected to the PBX 1 so that a suffix can be entered to the pre-canned message, which may for example give the salutation and contact information.

The service controlled can also save a log of what messages were left with which numbers in the storage unit 12. The user can scroll back through the log to verify that a message was left and of the right type to the right person.

The speech generator 12 can also be used to create a computer generated message giving the current time, date, or contact information based on time of day or based on scheduler information. This can be sent separately as an appendix to a pre-canned message.

The system is not limited to voice messages. When video 'answering machines' become common, the same concept can be applied. Computer generated addendums could include a display of the caller's contact schedule.

When performing 'busy line monitoring' and 'no answer automatic call backs', the service generator may request confirmation of acceptance after the message has been played. This acceptance may be in the form of DTMF, rotary dial or digital signal. The sender can be notified whether or not the message was accepted. This notification can be in the form of a call back, e-mail or a message placed in the senders messaging system.

We claim:

1. An automated telephone system comprising:
   a private automated branch exchange (PABX); and
   a telephone terminal connected to said PABX for communicating with a called party connected to the PABX; and said PABX including;
   a storage device for storing a plurality of pre-recorded messages entered through said terminal;
   a service controller responsive to commands from a calling party entered through said telephone terminal either to store pre-recorded messages in said storage device and associate them with a unique identifier, or to select one of said stored messages using its unique identifier in the event that the called party is unavailable and replay it over the telephone line to a remote party; and
   a PABX controller arranged, when said called party is busy, to place a camp-on on said called party's line and play said selected message when said called party's line becomes free, and when said called party does not answer, to detect when said line is next used and play said selected message to the called party.

2. An automated telephone system as claimed in claim 1, wherein said stored messages are voice messages.

3. An automated telephone system as claimed in claim 2, wherein said commands comprise DTMF signals entered through a telephone keypad.

4. An automated telephone system as claimed in claim 2, wherein said messages are digitally stored in said storage device and said system further comprises a speech generator to replay said messages in response to instructions from said service controller.

5. An automated telephone system as claimed in claim 1, wherein said service controller maintains a log of sent messages in said storage device.

6. An automated telephone system as claimed in claim 3, wherein said speech generator is capable of synthesizing an additional message giving the time or date and said service controller appends said additional message to said selected message.

7. An automated telephone system as claimed in claim 2, further comprising a real-time buffer to permit a suffix to be added to a selected message in real time.

* * * * *